INVENTOR
ERNEST B. POLLARD

ATTORNEYS

March 21, 1961 E. B. POLLARD 2,975,582
FRONT MOUNTED ROTARY WHEEL SIDE DELIVERY RAKE
Filed Dec. 8, 1949 2 Sheets-Sheet 2
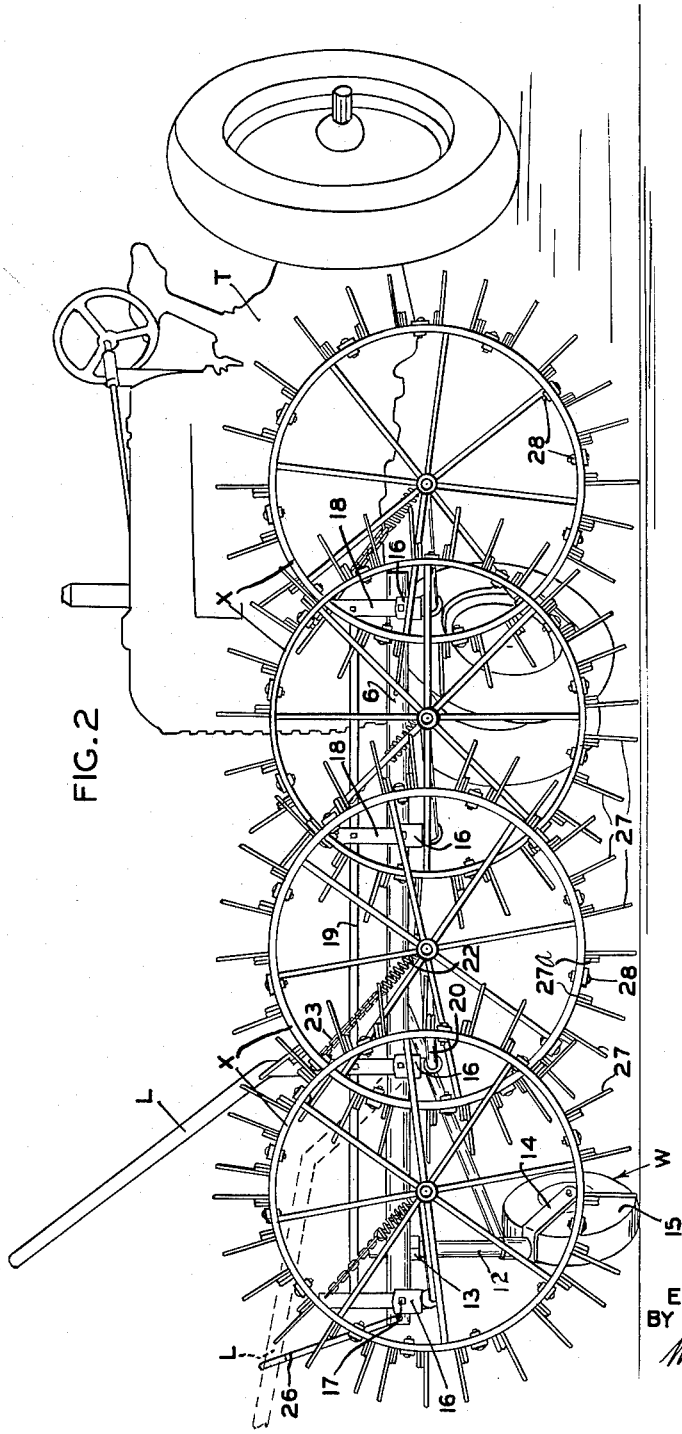
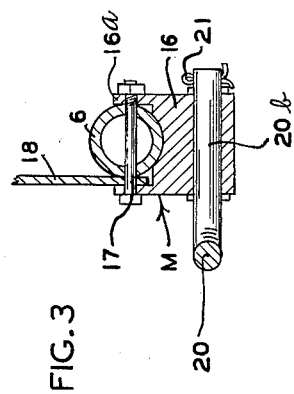
INVENTOR
ERNEST B. POLLARD
BY
*Williamson +*
*Williamson*
ATTORNEYS

2,975,582
FRONT MOUNTED ROTARY WHEEL SIDE DELIVERY RAKE

Ernest B. Pollard, Sherburn, Minn., assignor, by mesne assignments, to Daffin Corporation, a corporation of Delaware Filed Dec. 8, 1949, Ser. No. 131,725

4 Claims. (Cl. 56—377)

This invention relates to a machine or apparatus for lifting, turning and laterally moving or sweeping the stalks of grain, hay and other plant growth to form a windrow and for gently lifting and turning a windrow previously formed.

In the modern harvesting of small grain, soy beans and other farm products, the stalks are cut in the field by a swather or cutter and are simultaneously bunched into windrows extending longitudinally of the cutting operations. These windrows, when the grain or other product is cut, lie for the most part, above the short stubble left in the ground and are subsequently picked up, threshed or harvested by so-called "combines" or other modern harvesting machines, which often do not make provision for cutting the grain. It is desirable to allow the grain, soy bean stalks, hay or other farm products, to lie or age for several days before harvesting in order that the grain or other food seeds may mature and properly dry. Rain, wind and gravity cause the cut stalks in the windrow to settle and often, to become matted and wet, interfering with the proper drying and maturity of the seeds which are to be utilized as food and furthermore, disposing a considerable proportion of the windrow below the top of the stubble and the level at which the harvesting machines or combines pick up.

To prevent the grain or other food products from being adversely affected by moisture and to lift the stalks above the top of the stubble, these windrows often have to be turned, which at the present time, is generally accomplished by a side delivery rake. The action of such a rake threshes out a considerable proportion of the grain seeds and material losses occur when a windrow is so lifted or turned.

In the windrowing of various hay materials and other stalk crops, the stalks are usually cut by a swather or combine and later operations provide for raking of the material by dump rakes or side delivery rakes which follow a tractor or draft vehicle. In all instances, the wheels of the tractor trod down and depress considerable portions of the mowed crop and most conventional windrow formers including dump rakes and side delivery rakes are not provided for individual adjustability of the tines or wheels and consequently, leave many of the stalks in the stubble. They further, because of uneven ground, are subjected to strains and undue wear and fail to perform in a highly successful manner.

This invention is an improvement on the invention disclosed in my United States Letters Patent No. 2,459,961, entitled "Windrow Lifter and Turner," issued January 25, 1949.

It is an object of my present invention to provide a relatively simple, highly efficient, multi-wheel apparatus for quickly and gently lifting, turning and moving cut stalks to form a windrow as well as for turning windrows previously formed, to aerate the material and to let the same fully ripen.

Another object is the provision of a machine of the class described for attachment to the front end of the tractor which will collect, turn and windrow all material forwardly of the tractor through the utilization of a plurality of individually adjustable tined wheels arranged in echelon and rotated by engagement with the ground in the travel of the propelling vehicle.

A further object is the provision of a highly efficient windrow forming and turning machine adapted for support and attachment to the front of a tractor or other self-propelled vehicle and capable of forming from a relatively wide swath of cut crop stalks, an efficient windrow with accumulation of substantially all the material cut.

Another object is the provision of an attachment machine for connection with and support from the front of a self-propelled vehicle such as a tractor which in combination with a swather extending laterally from one side of the propelling vehicle, makes possible a highly efficient cutting of stalk crops simultaneously to the picking up, turning, collection and windrowing of a wide swath of mowed stalks adjacent the swath of the mower.

These and other objects and advantages of my invention will more fully appear from the following description made in connection with the accompanying drawings wherein like reference characters refer to similar parts throughout the several views and in which:

Fig. 2 is a prospective view of the machine shown in Fig. 1, taken from the front and left hand side of the tractor; and Fig. 3 is a detail cross section taken on the line 3—3 of Fig. 1, showing the mounting of one of the floating wheel spindle arms relatively to the frame of my machine attachment.

Figure 1:
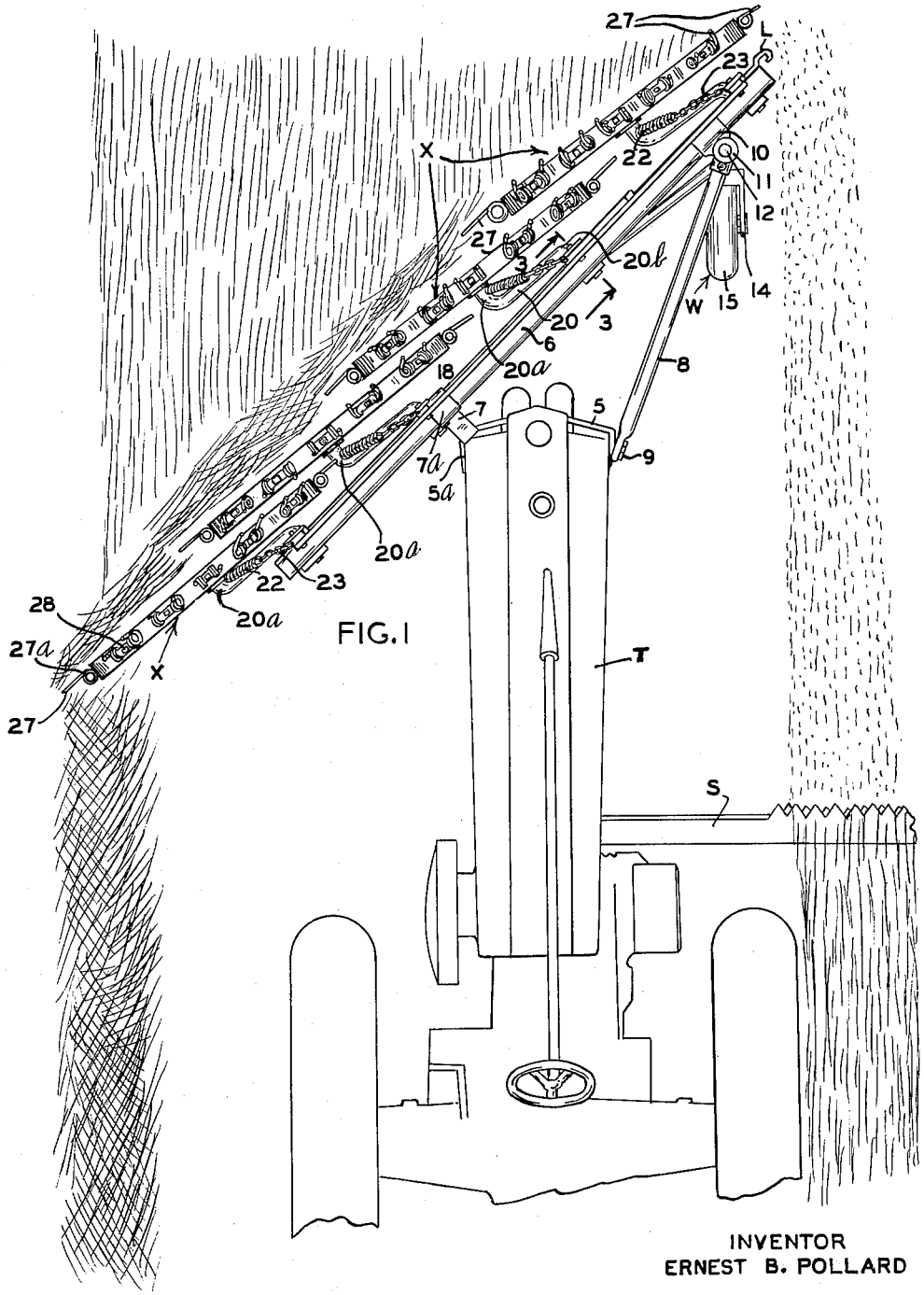
Fig. 1 is a top plan view illustrating an embodiment of my improved machine attached to the front of a conventional tractor equipped with a side swather of considerable length adapted to combine mowing and windrow-forming operations simultaneously during travel of the tractor over a field.

As shown in the drawings, an embodiment of my machine is attached to the front end of the chassis of a conventional tractor T which may be of the spaced, front wheel, standard type or of the row crop type. The tractor as shown, is equipped at the right hand side with an elongated, laterally projecting swather mechanism S of the sickle bar type. As shown, the laterally extending sickle head is broken away at the outer portion thereof.

I prefer to provide for attachment of my machine or apparatus, a heavy, horizontally disposed, U-shaped mounting bar 5, the rearwardly disposed short legs 5a thereof being rigidly connected by bolts or other attachment means with the front of the tractor chassis, and preferably also centrally secured to the front of the chassis with the main portion of the U disposed in spaced relation with the front of the tractor frame to facilitate connection of supporting brackets and bars.

The main frame of my machine or attachment, as shown, comprises a heavy, horizontal, tubular beam 6 constructed of steel or other suitable material disposed in a diagonal relation at the forward end of the tractor relative to the longitudinal center line thereof. I prefer to substantially rigidly mount beam 6 at an angle to the center line of the propelling vehicle and its normal line of travel approximating 45° although satisfactory results can be obtained with a variation of this angle between 35° and 55°.

Various means may be employed for supporting beam 6 and securing the same to the mounting member 5 in front of the tractor. As shown, I provide a short, rigid bracket 7 welded, bolted or otherwise, rigidly secured to the left hand corner of the U-shaped mounting member 5 and extending substantially perpendicularly to beam 6 and provided with a clamping socket 7a which encircles the beam and is rigidly clamped thereto. On the right hand side of the propelling vehicle, as shown, I provide a forwardly extending, rigid supporting and push bar 8 which may be of tubular construction having its inner end flattened and secured to the mounting member 5 and tractor T by a heavy bolt 9. The forward end of supporting and push bar 8 is swively connected for adjustability on a vertical axis with a clamp socket 10 which surrounds and rigidly engages the forward and right hand portion of the supporting beam 6.

The clamp socket 10 has integrally formed or rigidly affixed thereto a vertical sleeve 11 in which is journaled the upstanding pintle shaft 12 of a caster wheel designated as an entirety by the letter W. Pintle shaft 12 has a nut collar 13 forming a thrust bearing against the bottom of the sleeve 10 and at its lower end is rigidly affixed to a wheel fork 14 in which a pneumatically tired wheel 15 is journaled for engagement with the ground and partial support of the outer end of my supporting frame. The wheel is particularly adapted to support the forward and outer portion of the supporting beam during irregularities of the ground when the front wheel of the tractor is passing through a hollow or depression.

Mounted for independent floating action and for driving through engagement with the ground, are a plurality of windrowing wheels indicated as entireties by the letter X, said wheels being arranged in echelon, vertically disposed and extending in general planes substantially at 45° with the line of travel and longitudinal center line of the propelling vehicle. The structure of these wheels and the principle of individual floating mounting thereof is substantially similar to that shown in my Patent No. 2,459,961.

The several wheels X are supported from the diagonal supporting beam 6 with the interconnection as shown, of swingably adjustable mounting bar structures indicated as entireties by the letter M. Each of said structures comprises a depending, heavy bearing block 16 underlying in flush relation the underside of beam 6 and having a bifurcated upper end 16a which straddles beam 6 and is removably connected therewith by a nutted bolt 17.

The mounting bar structures each include an upstanding spring supporting arm 18 pivotally connected with the attachment bolts 17 and frictionally held at its lower end between one of the bifurcations of block 16 and the forward side of the diagonal supporting beam 6. The upper portions of the several upstanding spring supporting arms 18 are connected together for parallelogram adjustment by a narrow cross bar 19 disposed in spaced and parallel relation above the supporting beam 6. One of the preferably intermediate, upstanding arms 18 has rigidly attached or integrally formed therewith an upwardly and outwardly extending adjustment lever L by which the angulation of the several arms 18 to the vertical may be adjusted through about 45° for elevating or lowering to some extent the windrow wheels X as will later be more fully explained. Each of the windrow wheels X comprising a hub, circular felly and conventional spokes is rotatably mounted upon the forwardly projecting, short spindle 20a of a floating crank arm 20 having its inner end 20b angled with reference to the body thereof and journaled in one of the bearing blocks 16 and extending therethrough and as shown, being retained against forward displacement by suitable means such as a cotter pin 21. The wheels X are nearly counterbalanced for floating action by means in each instance of a coil spring 22 connected at its lower end with the outer portion of the appropriate crank arm 20 and having its upper end as shown, connected by a short chain 23 with an apertured portion in the upper end of the appropriate spring supporting arm 18.

From this description, it will be seen that each of the turner wheel structures floats independently and may rise and fall in accordance with the particular contour of the ground over which that wheel travels.

Each of the wheels X is provided with a series of substantially radial spring fingers or tines 27 constructed substantially similar to the spring fingers of my herein identified patent. To this end and to afford desired yieldability and resiliency, the fingers 27 are constructed in pairs as shown, having intermediate attachment portions which may be formed into a loop for clamp connection by suitable means such as bolts 28 with the rim of the turning wheel. Outwardly of the attachment portion as shown, a pair of coiled sections are formed terminating in outwardly disposed, substantially straight, ground-engaging and turning fingers, 27. These fingers may be slightly curved at their extremities in the direction of rotation.

The foremost wheel X of the series has its rear portion overlapping the second wheel and the wheels in echelon consecutively have a similar relation.

Any suitable means may be provided for retaining the lifting lever L in the wheel-raised position illustrated in dotted lines in Fig. 2. As shown, an upstanding hook 26 is fixed to the right hand and supporting end of beam 6. The lever L, when swung forwardly may be shifted slightly laterally to engage beneath the said hook.

In operation, my structure travels over the terrain in front of the tractor and covers at least the full swathe comprehended by the rear tractor wheels. The fingers 27 contact the ground and with the vertical disposition and angulation of the several wheels, tractive effort revolves the wheels to bring about a very natural and gentle lifting of the cut stalks upwardly, rearwardly and to the left of the machine. The action and movement of the cut stalks is a sweeping operation as contrasted with a raking operation. The windrow is thus formed, aerated and as it is formed, is turned to stand well above the stubble where a combine may readily and effectively pick up all of the stalks.

It is important in my structure that the forming and turning of this windrow is in advance of the tractor wheels and in the proper relationship to the longitudinal center line of the tractor. With my structure, as shown in Fig. 1, operations of cutting grain, alfalfa and other stalk crops and simultaneously forming and turning an adjacent swathe of cut stalks may be carried out. The tractor in this operation of course, continues through a clockwise or counterclockwise spiral travel relative to the field.

The structure at the forward end of my machine mounted in simple fashion by the frame comprising the diagonal horizontal beam 6 and its two fastening and bracing connections with the tractor balances the tractor nicely in operation.

It will of course be understood that various changes may be made in the form, details, arrangement and proportions of the parts without departing from the scope of my invention.

What I claim is:

1. A rotary hay rake comprising, a frame having one elongated, horizontal frame member extending rearwardly at an acute angle to the normal line of movement of said rake, means on said frame for transporting said frame spaced above the ground, a plurality of parallel, rotatable rake wheels having parallel axes of rotation all positioned at a slight angle to said elongated frame member arranged in echelon, a plurality of cranks corresponding in number to said wheels, each of said cranks being pivotally mounted at one end to said elongated frame member and each of said cranks being rotatably connected to one of said wheels at its other end and each of said cranks having a connecting portion disposed at an angle to the horizontal in a vertical plane, an elongated elevating member parallel to said elongated frame member and elevated with respect thereto, means operatively connected to said elevating member for altering the elevation of said elevating member with respect to said frame member, and a plurality of resilient links corresponding in number to said wheels, each connected at its upper end to said elevating member and each connected at its lower end to a different one of said cranks adjacent the lower end of the connecting portion of said crank, said links being of a length such that when said elevating member is in lowered position each of said wheels is independently resiliently suspended at ground level to conform to ground level irregularities, said links having a resiliency such that when said elevating member is in raised position all of said wheels are lifted above ground level.

2. A side delivery stalk sweeping and windrow forming attachment for an end of a tractor comprising, an elongated substantially horizontally and diagonally disposed raking wheel supporting beam to be moved forwardly in its diagonally disposed position, a plurality of stalk moving wheels diagonally, spacedly and rotatively supported from the beam and arranged compactly in overlapping and erect planes with each wheel having a portion thereof in overlapped relationship with the forward portion of the next adjacent wheel to the rearward, each stalk moving wheel having circumferentially spaced ground engaging fingers thereon, substantially equally spaced mounting members on the beam for each of the stalk moving wheels providing for independent substantially vertical up and down action for each wheel, means comprising a plurality of interconnected arms carried by said beam in spaced relation longitudinally of said beam, separate counterbalancing members connected to each of the wheel mounting members and to said means, and a lever arm for moving said interconnected arms in a direction to simultaneously raise the stalk moving wheels.

3. A side delivery stalk sweeping and windrow forming attachment for an end of a tractor comprising, an elongated substantially horizontally and diagonally disposed raking wheel supporting beam to be moved forwardly in its diagonally disposed position, a plurality of stalk moving wheels diagonally, spacedly and rotatively supported from the beam and arranged compactly in overlapping and erect planes with each wheel having a portion thereof in overlapped relationship with the forward portion of the next adjacent wheel to the rearward, each stalk moving wheel having circumferentially spaced ground engaging fingers thereon, substantially equally spaced mounting members on the beam for each of the stalk moving wheels providing for independent substantially vertical up and down action for each wheel, means comprising a plurality of spaced arms carried by the beam, said arms corresponding in number to said mounting members, a separate counterbalancing member connected to each of said mounting members and to a respective one of said arms, and means interconnecting said arms, one of the last two mentioned means having a lever connected thereto and extending therefrom for simultaneously raising the stalk moving wheels.

4. A side delivery stalk sweeping and windrow forming attachment for an end of a tractor comprising, an elongated substantially horizontally and diagonally disposed raking wheel supporting beam to be moved forwardly in its diagonally disposed position, a plurality of stalk moving wheels diagonally, spacedly and rotatively supported from the beam and arranged compactly in overlapping and erect planes with each wheel having a portion thereof in overlapped relationship with the forward portion of the next adjacent wheel to the rearward, each stalk moving wheel having circumferentially spaced ground engaging fingers thereon, substantially equally spaced mounting members on the beam for each of the stalk moving wheels providing for independent substantially vertical up and down action for each wheel, means comprising a plurality of spaced arms carried by the beam, said arms corresponding in number to said mounting members, a separate counterbalancing member connected to each of said mounting members and to a respective one of said arms, and means interconnecting said arms, one of said arms comprising a lever and extending beyond said means interconnecting the arms for simultaneously raising the stalk moving wheels.

References Cited in the file of this patent
UNITED STATES PATENTS

| | | |
|---|---|---|
| 2,296,065 | Slamp | Sept. 15, 1942 |
| 2,447,354 | Morrill | Aug. 17, 1948 |
| 2,472,260 | Morrill | June 7, 1949 |
| 2,531,934 | Crose | Nov. 28, 1950 |
| 2,532,652 | Wray | Dec. 5, 1950 |